Sept. 29, 1925.
M. V. BOCK
SPINDLE
Filed May 29, 1924
1,555,627
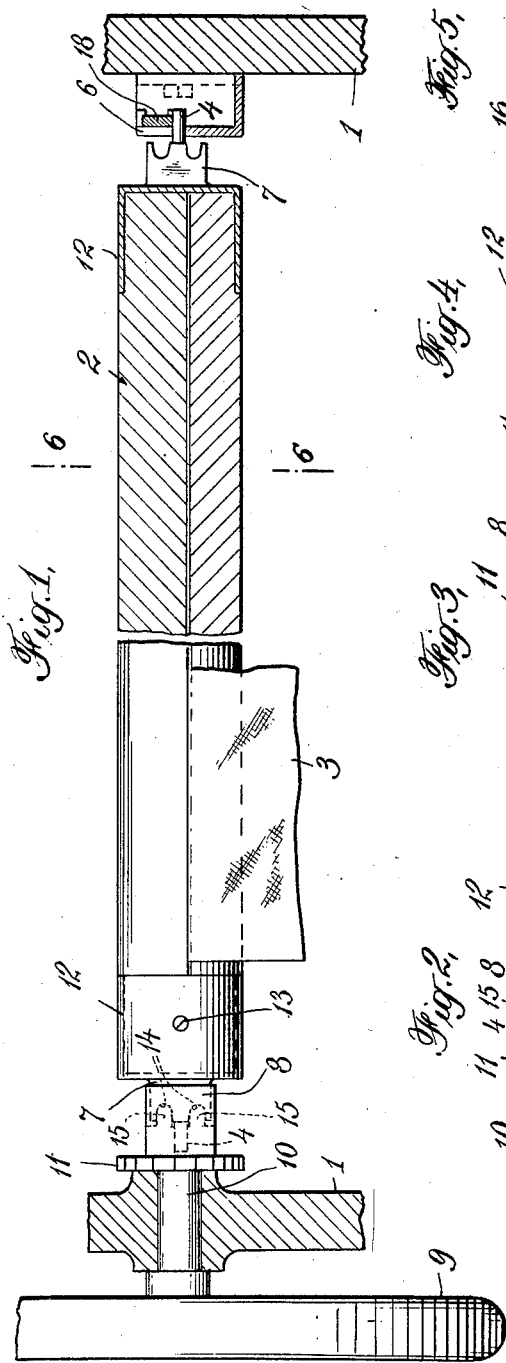
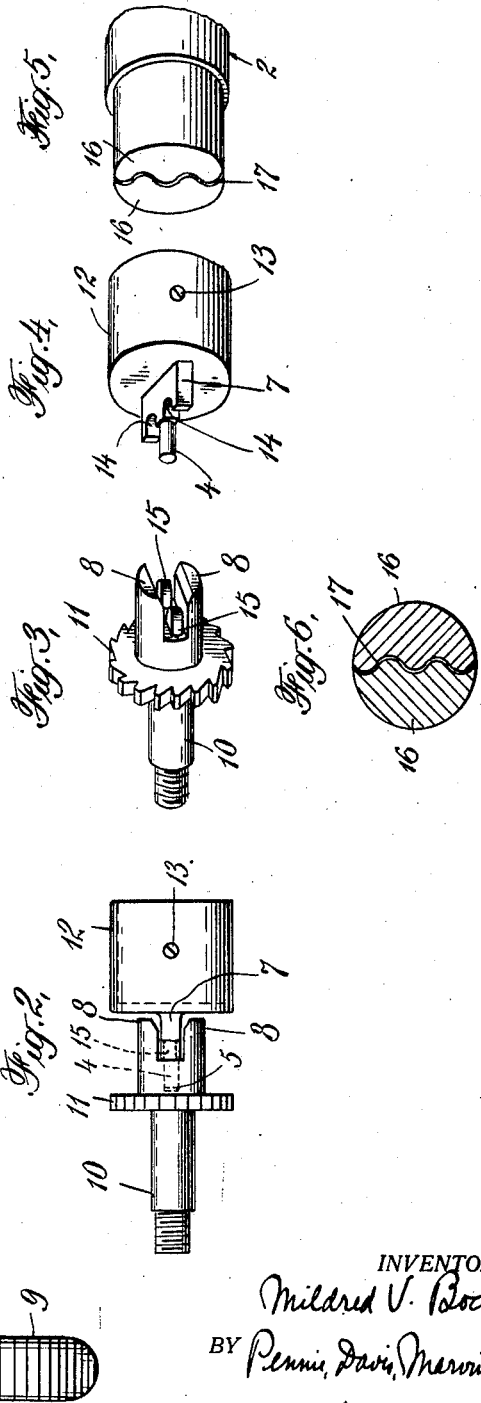
INVENTOR
Mildred V. Bock
BY Pennie, Davis, Marvin & Edmonds
ATTORNEYS Patented Sept. 29, 1925.

1,555,627

UNITED STATES PATENT OFFICE.

MILDRED VICTORIA BOCK, OF MOUNTAIN LAKES, NEW JERSEY.

SPINDLE.

Application filed May 29, 1924. Serial No. 716,542.

*To all whom it may concern:*

Be it known that I, MILDRED V. BOCK, a citizen of the United States, residing at Mountain Lakes, in the county of Morris, State of New Jersey, have invented certain new and useful Improvements in Spindles; and I do hereby declare the following to be a full, clear, and exact description of the invention, such as will enable others skilled in the art to which it appertains to make and use the same.

This invention relates to rollers for flexible sheet material and supports therefor. In particular, it relates to the rollers or spindles upon which the gelatine rolls or films of duplicating machines are wound.

The gelatine roll of a duplicating machine is wound upon a spindle which is placed in the machine at one end thereof and somewhat below the level of the bed. From this rear spindle the roll is unwound, passing over the bed and around a second spindle mounted at the forward end of the machine. In making the inked impression upon the roll and in taking the imprints from it, it is necessary that the roll be stretched very tight over the bed, as otherwise it will adhere to the printed sheets as they are withdrawn and thus cause trouble. In practice, when the roll has been moved to present a clean surface, the rear spindle is held against rotation (commonly by the application of a brake) and the forward spindle rotated until the desired tautness has been attained. A ratchet on the second spindle cooperating with a pawl on the frame of the machine prevents slackening of the roll. The inked original is then applied and the impression made from which the duplicate copies are to be struck. When the desired number of imprints has been taken from the exposed surface of the roll or when the ink has become exhausted, it becomes necessary to advance the roll to present a clean surface for a new impression. To do this, the operator releases the brake and winds the used portion of the roll upon the forward spindle.

The spindles, which are of wood, are provided at their ends with pivot pins. These pins terminate at their inner ends in flat plates, which are driven part way into the ends of the spindles and are fixed there by means of rivets. One pin of each spindle is journaled in the frame of the machine, the other fits within a rotatable socket provided with two lateral jaws which receive between them the projecting flat portion of the pin and through it impart rotation to the spindle. In stretching the roll taut across the bed of the machine, it is subjected to a very severe strain. The roll is strong and can stand this. The pivot pins, however, are not so strong and cannot always stand it. As a result they often twist off or snap and seriously interfere with the duplicating operation. The danger of this failure of the pins is increased by the fact that the operator sometimes attempts to wind the roll upon the forward spindle to present a clean transfer surface without first releasing the brake. The spindle pins now in use can hardly survive this treatment.

It is an object of this present invention to provide these spindles with pins, which shall be free of this objection, and which shall be amply able to stand the strains to which they may be subjected in use. I have attained this object broadly by making the pins integral with a cap designed to fit over the end of the spindle and providing the socket and pin with cooperating, reenforcing parts.

Another objectionable feature in duplicating machine practice is the manner in which the rolls are secured to the spindles. The spindle is usually provided with a longitudinal slot into which fits a strip which is tacked over the cloth end of the roll. The operation of securing the roll to the spindle is tedious and time consuming. Furthermore, it often happens that the roll pulls the strip from its socket. It is a further object of this invention to provide improved means for securing the rolls to the spindles. I do this by making the spindle in two interfitting longitudinal sections, which grip the end of the roll firmly between them and are themselves held together by means of the caps which fit over the ends and of which the pivot pins form a part.

The accompanying drawings illustrate a preferred embodiment of my invention. In these drawings, Fig. 1 is a view partly in section showing a spindle constructed in accordance with the present invention mounted in a duplicating machine; Fig. 2 is a detail showing the relation of the pin to its socket, the position of these parts in this figure being shown at right angles to their position in Fig. 1; Fig. 3 is a perspective view of the socket; Fig. 4 is a perspective view of the pivot cap and its pin; Fig. 5 is a perspective view of the end of the spindle adapted to be seated within the cap shown in Fig. 4, and Fig. 6 is a section through the spindle taken along line 6—6 of Fig. 1.

In these drawings, 1 repr sents the frame of the duplicating machine. As the structure of this machine has nothing to do with the present invention, no attempt has been made to illustrate it in detail. Mounted on this machine is a spindle 2 about which is wound a gelatine roll 3, the cloth end of the roll being shown. The ends of this spindle are provided with pivot pins 4, one of which is seated within the socket 5 and the other within a slot 6. At the base of each pin is a lateral extension or plate 7, which fits between two lateral jaws 8 of the socket 5, which jaws constitute in effect a slot in the socket, and imparts rotation to the spindle when the socket is rotated. This rotation is effected through any suitable means, as for example, the handwheel 9 mounted upon the stub-shaft 10 of the socket. The socket is provided with a ratchet 11 cooperating with a pawl, not shown, so that rotation is possible in one direction only. The foregoing is in a general way a description of the ordinary spindle and its mounting, used in duplicating machines.

In accordance with my invention, instead of driving the pins into the ends of the spindle, I have made each pin integral with a cap 12 designed to fit over the end of the spindle and be fixed thereto, as for example by means of a screw 13. The lateral extension or plate 7 at the base of the pin, is provided with two recesses 14, one on either side of the pin proper. These recesses are designed to receive lugs or projections 15 situated between the jaws 8 of the socket member and on either side of the socket proper, which receives the end of the pin 4. These lugs cooperating with lateral extension 7 act to reenforce the pin so that no matter what angular position the socket may be in when the maximum strain is exerted, a part of the strain upon the end of the pin will be borne by the extension 7 and the socket. Furthermore, by making the pin integral with the cap 12, the danger that it may be torn loose in the spindle or twist off is obviated.

The spindle itself is made of two longitudinally interfitting halves 16, provided with co-operating corrugated fac s 17, between which the cloth end of the roll is designed to be clamped.

In operation the roll is unwound from the rear spindle, its cloth end placed between the corrugated halves of the forward spindle, the two pivot caps placed in position and the spindle mounted on the machine. This is done by first inserting one of the pins into the socket and dropping the other within the slot 6. As shown a latch 18 prevents upward movement. The roll is then wound about the forward spindle by turning the handwheel 9. There is no danger that the roll will ever be pulled from the spindle, nor that the pins will break or twist under the force exerted to pull the roll taut.

I claim:

1. In a duplicating machine, the combination of a spindle for the gelatine roll, a pivot pin on the end of the spindle, a slotted socket journalled on the frame of the machine in which the pin is supported and means within the slot on the socket for reinforcing the pin.

2. In a duplicating machine, the combination of a spindle for the gelatine roll, a pivot pin on the end of the spindle having a recess at its base, a socket journaled on the frame of the machine in which the pin is supported, and a projection on the socket fitting within the recess at the base of the pin for carrying part of the strain on the pin.

3. In a duplicating machine, the combination of a spindle for the gelatine roll, a pivot pin on the end of the spindle having recesses at its base, a two-jawed socket journaled on the frame of the machine for receiving the pin, a lateral extension at the base of the pin lying between the jaws of the socket and transmitting the rotation of the socket to the spindle, and lugs on the socket fitting within the recesses in the lateral extension at the base of the pin for reenforcing the pin.

4. In a duplicating machine the combination of a spindle for the gelatine roll, comprising two longitudinally cooperating parts between which the end of the roll is clamped, and removable caps fitting over the ends of the spindle for holding the two parts in clamped position.

5. In a duplicating machine, the combination of a spindle for the gelatine roll, comprising two longitudinally cooperating parts between which the end of the roll is clamped, and removable caps fitting over the ends of the spindle for holding the two parts in clamp d position, pivot pins on the caps, and sockets on the frame of the machine designed to receive the pivot pins.

6. A spindle for a duplicating machine comprising the combination of two longitudinally separable parts having cooperating corrugated faces designed to clamp the end of a roll between them, removable caps fitting over the ends of the spindle for holding the two parts in clamping position, and pivot pins on said caps.

In testimony whereof I affix my signature.

MILDRED VICTORIA BOCK,